May 15, 1934.    T. MURRAY    1,958,858
VALVE
Filed Dec. 19, 1932
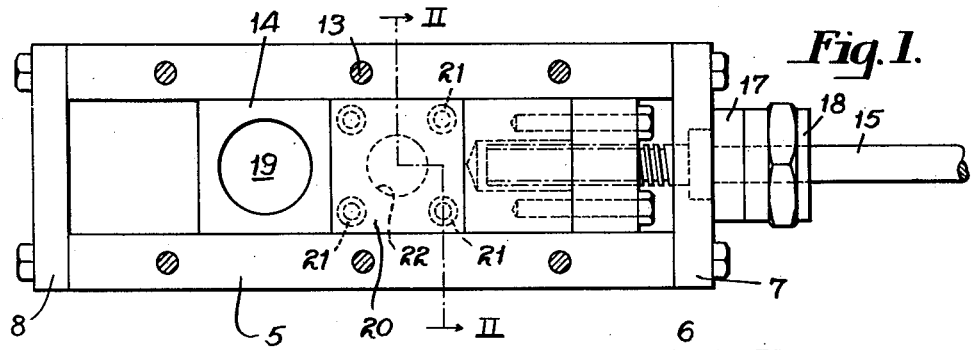
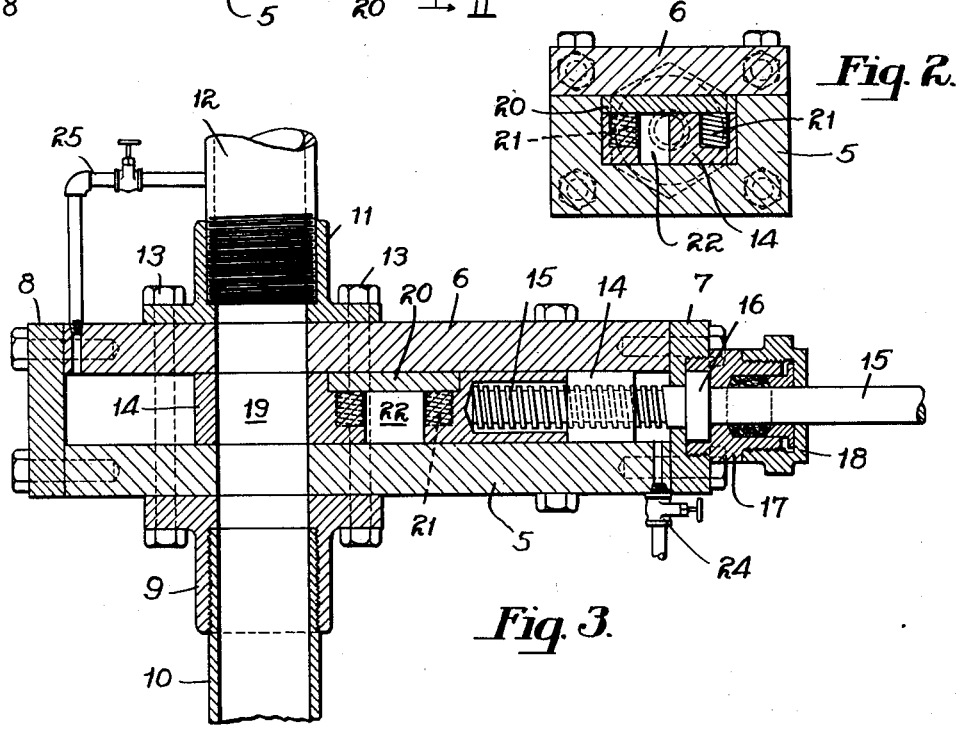
INVENTOR
Thomas Murray,
By Archworth Martin,
Attorney.

Patented May 15, 1934

1,958,858

UNITED STATES PATENT OFFICE 1,958,858
VALVE

Thomas Murray, McKeesport, Pa.

Application December 19, 1932, Serial No. 647,901

1 Claim. (Cl. 251—62)

My invention relates to valves, and more particularly to valve structures that are especially adapted for the capping of oil wells, although they are capable of use in various other relations.

In the drilling of oil wells, when a productive sand is reached that contains oil or gas under extremely high pressures, considerable difficulty is frequently encountered in capping the wells and bringing the flow under control. These difficulties arise primarily because of extremely high pressures, but even when a valved capping device is placed in position, trouble is frequently experienced in operating the valve, by reason of the presence of sand and gravel in the flowing stream.

One object of my invention is to provide a capping device of such form that it may be conveniently applied to the casing of high pressure wells, and whereby flow therefrom can be more effectively controlled than by the employment of various previously used structures.

Another object of my invention is to provide a structure whereby any fluid which seeps past the valve-seating surfaces and tends to collect in the valve chamber can be readily discharged or eliminated from the chamber.

One form which my invention may take is shown in the accompanying drawing wherein Figure 1 is a plan view of the capping device and valve; Fig. 2 is a view taken on the line II—II of Fig. 1; Fig. 3 is a longitudinal sectional view of the structure, showing the valve in open position, and Fig. 4 is a similar view showing the valve closed.

The structure includes a valve casing consisting of a channeled block 5, a cap plate 6, and end plates 7 and 8, all of such parts being detachably secured together by means of suitable bolts and screws, as clearly shown in the drawing. The block 5 has a flanged coupling 9 secured thereto for connection to a well casing 10, while the top plate 6 carries a flanged coupling 11 into which a pipe 12 may be threaded. The couplings 9 and 11 are secured in place by means of bolts 13 which may be employed also to assist in holding the members 5 and 6 together.

A slide valve 14 is positioned within the valve casing, the vertical edges of the valve block 14 having snug-fitting engagement with the vertical walls of the valve casing, and the top and bottom surfaces of the valve block having snug-fitting engagement with the members 6 and 5 of the casing. The valve block 14 is operated by a screw 15, which has threaded engagement with the valve block and has an annular shoulder 16 that is rotatably supported in a bearing bushing 17 that is in turn threaded into the end plate 7. A stuffing box 18 is provided to prevent leakage past the stem of the screw 15. The valve block 14 is provided with a port or passageway 19 that may be brought into alignment with the couplings 9 and 11, to permit flow past the valve. The upper side of the valve block is recessed for the reception of a sealing plate 20, and contains pockets for compression springs 21 that serve to snugly hold the plate 20 against the underside of the top plate 6.

The block 14 is entirely cut away beneath the central portion of the sealing plate 20, as shown at 22, so that when the valve is in closed position, as shown in Fig. 4, the opening 22 will be in registry with the coupling 9, and the well pressure will be imposed against the underside of the plate 20, to hold it in sealing engagement with the top plate 6 of the valve casing.

The plate 20 has close-fitting engagement with the walls of the recess containing the same, and the pressure of the well supplements the spring pressure to prevent leakage past the valve 20 to the ends of the valve casing. This is desirable even though the valve block 14, as a whole, has close-fitting engagement with the top, bottom and sides of the valve casing. The valve parts including the valve casing, are preferably made of non-corrodible metal such as stainless steel.

Should any fluid seep past the valve block to the ends of the valve casing, such fluid may be drawn off at either end as by a valve such as shown at 24, or may be by-passed by a conduit 25 to the line pipe 12.

Further, as to the sealing plate 20, it will be seen that the well pressure is directed against the central portion thereof when the valve is closed, through the opening 22, so that there is a condition of centralized pressure on the sealing plate, and the opening 22 is of such size that it is not likely to become clogged with sand and gravel.

I claim as my invention:—

Valve structure for use with well casing and the like, comprising an elongated casing of generally rectangular form in cross section and having passageways through its upper and lower walls, a rectangular valve block of elongated form slidably supported in said casing and having snug-fitting engagement with the four walls thereof, the block being provided near one end with a port positioned to be brought into alinement with said passageways, a sealing plate inset in the upper side of said block, approximately midway between the ends of the block and normally flush with the adjacent surface of the block, the block being cut away behind the sealing plate, to expose the underside of the plate when the valve is in closed position, and a series of springs inset in the block, behind the sealing plate and in circumferentially spaced relation to the said cutaway portion.

THOMAS MURRAY.